United States Patent
Catt

(10) Patent No.: US 9,437,054 B2
(45) Date of Patent: Sep. 6, 2016

(54) METHOD FOR PREDICTING AN AUXILIARY POWER UNIT FAULT

(71) Applicant: GE Aviation Systems Limited, Cheltenham (GB)

(72) Inventor: Christopher Joseph Catt, Southampton (GB)

(73) Assignee: GE AVIATION SYSTEMS LIMITED, Cheltenham (GB)

( * ) Notice: Subject to any disclaimer, the term of this patent is extended or adjusted under 35 U.S.C. 154(b) by 195 days.

(21) Appl. No.: 14/265,573

(22) Filed: Apr. 30, 2014

(65) Prior Publication Data

US 2015/0096359 A1    Apr. 9, 2015

(30) Foreign Application Priority Data

Oct. 7, 2013 (GB) .................................. 1317666.4

(51) Int. Cl.

| | |
|---|---|
| *G01M 15/14* | (2006.01) |
| *G07C 5/08* | (2006.01) |
| *B64D 41/00* | (2006.01) |
| *G07C 5/00* | (2006.01) |
| *F01D 17/02* | (2006.01) |
| *F01D 17/20* | (2006.01) |
| *F01D 21/00* | (2006.01) |

(Continued)

(52) U.S. Cl.

CPC ............. *G07C 5/0808* (2013.01); *B64D 41/00* (2013.01); *F01D 17/02* (2013.01); *F01D 17/20* (2013.01); *F01D 21/003* (2013.01); *F02C 9/00* (2013.01); *G07C 5/008* (2013.01); *B64D 2045/0085* (2013.01); *F05D 2220/50* (2013.01); *F05D 2260/80* (2013.01); *F05D 2270/304* (2013.01); *F05D 2270/44* (2013.01)

(58) Field of Classification Search

CPC ............ F05D 2260/80; F05D 2220/50; B64D 2045/0085; B64F 5/0045; F01D 17/02; F01D 21/003; G01M 15/00
USPC ..................................................... 73/112.01
See application file for complete search history.

(56) References Cited

U.S. PATENT DOCUMENTS

| | | | | |
|---|---|---|---|---|
| 6,122,575 A | * | 9/2000 | Schmidt | G06F 11/2252 244/1 R |
| 6,845,306 B2 | * | 1/2005 | Henry | B64D 41/00 701/29.6 |

(Continued)

FOREIGN PATENT DOCUMENTS

| | | |
|---|---|---|
| JP | 2007024047 A | 2/2007 |
| JP | 2012512350 A | 5/2012 |

OTHER PUBLICATIONS

Unofficial English translation of Japanese Office Action issued in connection with corresponding JP Application No. 2014205427 on Sep. 8, 2015.

*Primary Examiner* — Freddie Kirkland, III
(74) *Attorney, Agent, or Firm* — GE Global Patent Operation; William S. Munnerlyn

(57) ABSTRACT

A method of predicting an auxiliary power unit fault in an aircraft having an auxiliary power unit and multiple sensors related to the auxiliary power unit, components thereof, and systems related thereto, including receiving a sensor signal from at least one of the multiple sensors to define a sensor output, comparing the sensor output to a reference value and predicting a fault in the auxiliary power unit based on the comparison.

20 Claims, 3 Drawing Sheets

(51) Int. Cl.
*F02C 9/00* (2006.01)
*B64D 45/00* (2006.01)

(56) References Cited

U.S. PATENT DOCUMENTS

| | | | |
|---|---|---|---|
| 7,308,614 B2 | 12/2007 | Kojori | |
| 7,577,549 B2 | 8/2009 | Osborn et al. | |
| 8,484,145 B2 | 7/2013 | Lacaille | |
| 8,843,348 B2 * | 9/2014 | Pascu | G01M 13/028 701/100 |
| 8,909,393 B2 * | 12/2014 | Catt | B64C 19/00 244/75.1 |
| 8,972,101 B2 * | 3/2015 | Catt | B64F 5/0045 701/14 |
| 8,989,953 B2 * | 3/2015 | Catt | B64C 9/20 701/31.9 |
| 2003/0187554 A1 | 10/2003 | Henry et al. | |
| 2005/0222747 A1 | 10/2005 | Vhora et al. | |
| 2007/0260374 A1 * | 11/2007 | Morrison | F02D 41/22 701/99 |
| 2011/0040526 A1 * | 2/2011 | Blotenberg | F01D 17/00 702/182 |
| 2011/0307431 A1 * | 12/2011 | Lacaille | G05B 23/0221 706/17 |
| 2012/0323531 A1 | 12/2012 | Pascu et al. | |
| 2013/0013222 A1 * | 1/2013 | Gu | F02C 9/00 702/33 |
| 2013/0030614 A1 * | 1/2013 | Ding | G07C 5/085 701/16 |
| 2015/0068293 A1 * | 3/2015 | Ding | B64F 5/0045 73/112.01 |

* cited by examiner

METHOD FOR PREDICTING AN AUXILIARY POWER UNIT FAULT

CROSS-REFERENCE TO RELATED APPLICATIONS

This application claims priority under 35 U.S.C. §119 to British Patent Application No. 13176664, filed Oct. 7, 2013, the disclosure of which is incorporated herein by reference.

BACKGROUND OF THE INVENTION

Contemporary aircraft may include an auxiliary power unit (APU) in addition to main propulsion engines. The APU may perform a variety of functions including providing secondary power to the aircraft as well as providing pressurized bleed air for main engine starting and the aircraft's environmental control system. Currently, airlines and maintenance personnel wait until a fault or problem occurs with the APU and then attempt to identify the cause and fix it either during scheduled or, more likely, unscheduled maintenance. Fault occurrences are also recorded manually based on pilot discretion.

BRIEF DESCRIPTION OF THE INVENTION

In one embodiment, the invention relates to a method of predicting an auxiliary power unit fault in an aircraft having an auxiliary power unit and multiple sensors including receiving, during pre-flight or post-flight, a sensor signal from at least one of the multiple sensors to define a sensor output, comparing, by a controller, the sensor output to a reference value for the sensor output, predicting, by a controller, a fault in the auxiliary power unit based on the comparison, and providing, by a controller, an indication of the predicted fault

DESCRIPTION OF EMBODIMENTS OF THE INVENTION

Figure 1:
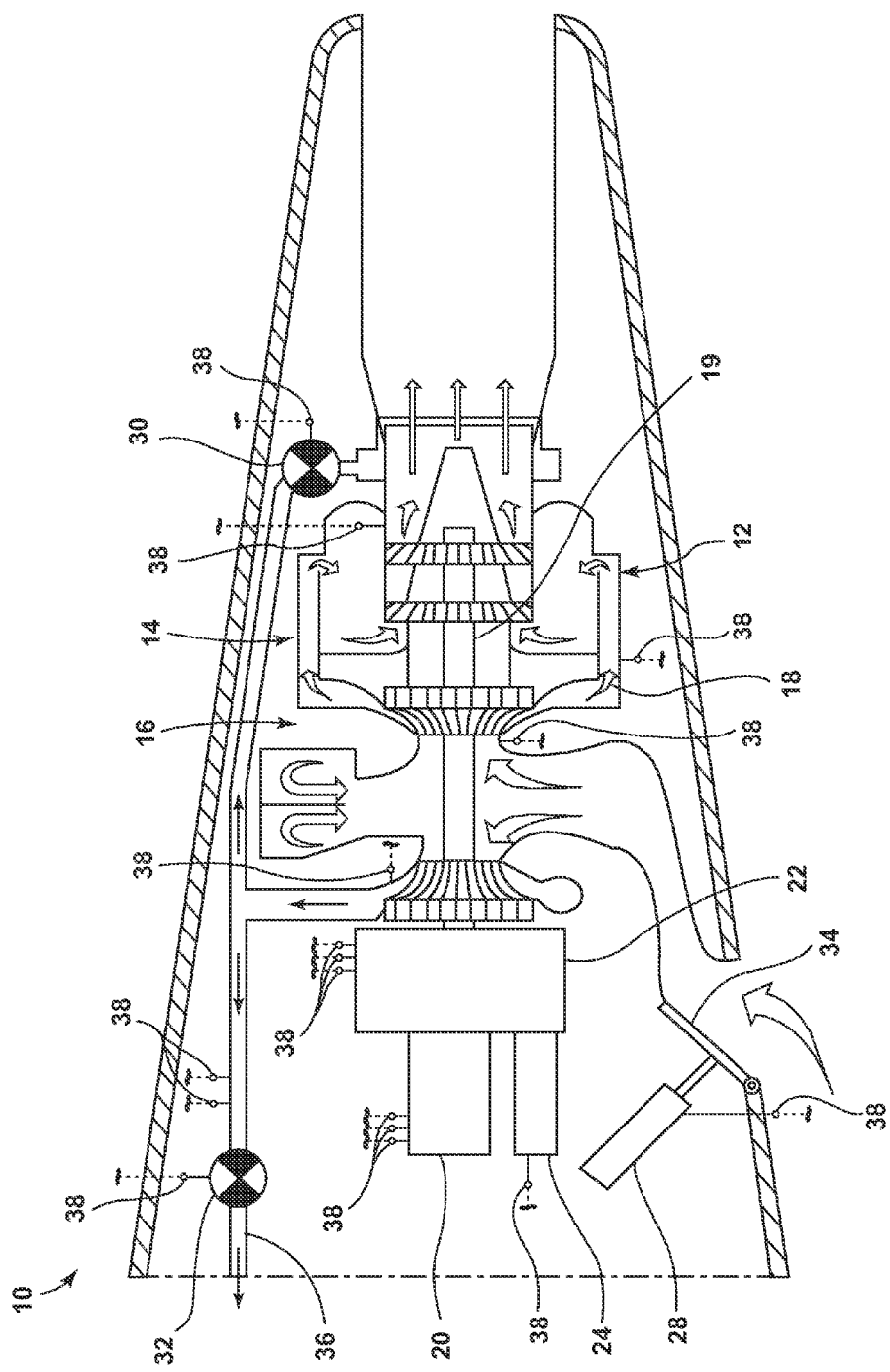
FIG. 1 is a schematic view of an auxiliary power unit, systems related to the auxiliary power unit, and sensors.

FIG. 1 schematically depicts an APU 10 in the form of a gas turbine engine that includes a combustion system 12, a power turbine 14, and a compressor 16. During operation of the APU 10, the compressor 16 draws in ambient air, compresses it, and supplies the compressed air to the combustion system 12. The combustion system 12 receives fuel from a fuel source, schematically illustrated with arrows 18, and the compressed air from the compressor 16, and supplies high-energy combusted air to the power turbine 14, causing it to rotate. The power turbine 14 includes a shaft 19 that may be used to drive a generator 20 for supplying electrical power, and to drive its own compressor and/or an external load compressor. More specifically, a gearbox 22 transfers power from the power turbine 14 to an oil-cooled generator 20 to provide electrical power. Within the gearbox 22, power may also be transferred to engine accessories such as a fuel control unit, a lubrication module, and cooling fan, none of which are shown. A starter 24, such as a starter motor, may be mounted on the gearbox 22 and connected through the gear train to perform the starting function of the APU 10.

Further, several actuated devices have been illustrated including a flap motor 28, a surge control valve 30, and a bleed valve 32. The flap motor 28 may control inlet guide vanes 34, which regulate airflow to the compressor 16. The surge control valve 30 may maintain stable or surge-free operation of the APU 10. The bleed valve 32 controls a flow of bleed air from the APU 10 to the bleed air distribution system 36. It will be understood that any number of actuated devices may be included in the APU 10 and that that APU 10 may be operably coupled to any number of related systems.

Further, multiple sensors 38 related to the APU 10, components thereof, and systems related thereto may be included. Such multiple sensors 38 may include, by way of non-limiting examples, APU bleed air flow sensor, APU bleed air pressure sensor, APU bleed air temperature sensor, APU transformer rectifier unit current sensor, APU transformer rectifier unit voltage sensor, APU speed sensor, APU high oil sensor, APU low oil level sensor, APU high oil temperature sensor, APU low oil temperature sensor, exhaust gas temperature sensor, a fuel flow sensor, a fuel pressure sensor, a surge control valve position sensor, and inlet guide vane position sensor, an inlet pressure sensor, a load compressor air flow sensor, a load compressor inlet temperature sensor, a load compressor outlet temperature sensor, a generator frequency sensor, a generator load sensor, a generator voltage sensor, a generator oil temperature sensor, etc. some of which have been schematically illustrated.

Figure 2:
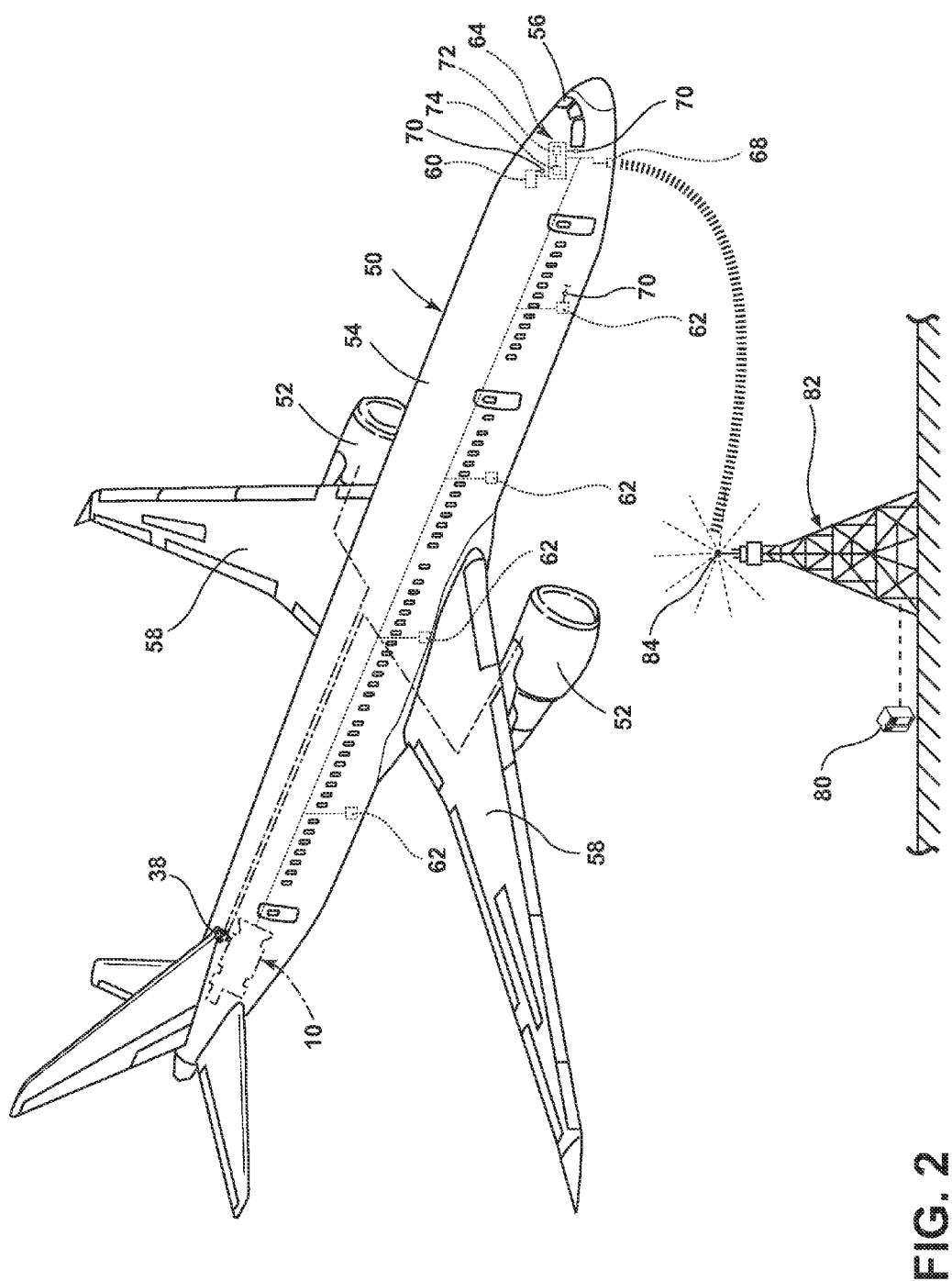
FIG. 2 is a perspective view of the aircraft and a ground system in which embodiments of the invention may be implemented.

FIG. 2 schematically illustrates an aircraft 50 that may execute embodiments of the invention and may include one or more propulsion engines 52 coupled to a fuselage 54, a cockpit 56 positioned in the fuselage 54, and wing assemblies 58 extending outward from the fuselage 54. While the aircraft 50 is illustrated as a commercial aircraft it will be understood that the APU 10 may be installed in any suitable aircraft. Typically, APUs and related systems such as cooling systems are mounted in a compartment in the aft section of the aircraft 50.

One or more control mechanisms 60 may be included in the cockpit 56 and may be operated by a pilot to start the APU 10, control the position of the flap motor 28, control the position of the surge control valve 30, control the position of the bleed valve 32, etc. A plurality of additional aircraft systems 62 that enable proper operation of the aircraft 50 may also be included in the aircraft 50 as well as a controller 64, and a communication system having a wireless communication link 68. The controller 64 may be operably coupled to the engines 52, the plurality of aircraft systems 62, and the APU 10 including its various components and the multiple sensors 38. Further, additional sensors 70, such as sensors related to the aircraft systems 62, the control mechanism 60, etc. may be operably coupled to the controller 64.

The controller 64 may also be connected with other controllers of the aircraft 50. The controller 64 may include memory 72, the memory 72 may include random access memory (RAM), read-only memory (ROM), flash memory, or one or more different types of portable electronic memory, such as discs, DVDs, CD-ROMs, etc., or any suitable combination of these types of memory. The controller 64 may include one or more processors 74, which may be running any suitable programs. The controller 64 may be a portion of an FMS or may be operably coupled to the FMS.

A computer searchable database of information may be stored in the memory 72 and accessible by the processor 74. The processor 74 may run a set of executable instructions to display the database or access the database. Alternatively, the controller 64 may be operably coupled to a database of information. For example, such a database may be stored on an alternative computer or controller. It will be understood that the database may be any suitable database, including a single database having multiple sets of data, multiple discrete databases linked together, or even a simple table of data. It is contemplated that the database may incorporate a number of databases or that the database may actually be a number of separate databases.

The database may store data that may include historical data related to the APU 10 and its related systems related to the aircraft 50 and/or to a fleet of aircraft. The database may also include reference values for the APU 10 and its related systems.

Alternatively, it is contemplated that the database may be separate from the controller 64 but may be in communication with the controller 64 such that it may be accessed by the controller 64. For example, it is contemplated that the database may be contained on a portable memory device and in such a case, the aircraft 50 may include a port for receiving the portable memory device and such a port would be in electronic communication with controller 64 such that controller 64 may be able to read the contents of the portable memory device. It is also contemplated that the database may be updated through the wireless communication link 68 and that in this manner, real time information such as information regarding historical fleet wide data may be included in the database and may be accessed by the controller 64.

Further, it is contemplated that such a database may be located off the aircraft 50 at a location such as airline operation center, flight operations department control, or another location. The controller 64 may be operably coupled to a wireless network over which the database information may be provided to the controller 64.

While a commercial aircraft has been illustrated, it is contemplated that portions of the embodiments of the invention may be implemented anywhere including in a controller or computer 80 at a ground system 82. Furthermore, database(s) as described above may also be located in a destination server or a computer 80, which may be located at and include the designated ground system 82. Alternatively, the database may be located at an alternative ground location. The ground system 82 may communicate with other devices including the controller 64 and databases located remote from the computer 80 via a wireless communication link 84. The ground system 82 may be any type of communicating ground system 82 such as an airline control or flight operations department.

One of the controller 64 and the computer 80 may include all or a portion of a computer program having an executable instruction set for predicting an APU fault in the aircraft 50. Such faults may include improper operation of components as well as failure of components. Regardless of whether the controller 64 or the computer 80 runs the program for predicting the fault, the program may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc. that have the technical effect of performing particular tasks or implement particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, or special purpose processing machine to perform a certain function or group of functions.

It will be understood that the aircraft 50 and computer 80 merely represent two exemplary embodiments that may be configured to implement embodiments or portions of embodiments of the invention. During operation, either the controller 64 and/or the computer 80 may predict an APU fault. By way of non-limiting example, a control mechanism 60 may be utilized to start the APU 10. The controller 64 and/or the computer 80 may utilize inputs from the control mechanism 60, the multiple sensors 38, the database(s) and/or information from airline control or flight operations department to predict the APU fault. Among other things, the controller 64 and/or the computer 80 may analyze the data output by one or more of the multiple sensors 38 over time to determine drifts, trends, steps or spikes in the operation of the APU 10 or its related systems. Such anomalies in the data may be too subtle on a day-to-day comparison to make such predictions of fault. Once an APU fault has been predicted an indication may be provided on the aircraft 50 and/or at the ground system 82. It is contemplated that the prediction of the APU fault may be done pre-flight, during flight, may be done post flight, or may be done after any number of flights. The wireless communication link 68 and the wireless communication link 84 may both be utilized to transmit data such that the fault may be predicted by either the controller 64 and/or the computer 80.

Figure 3:
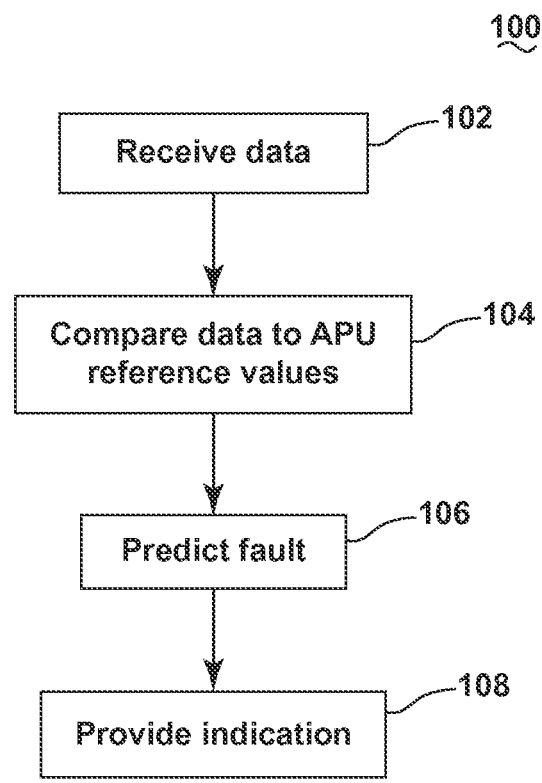
FIG. 3 is a flowchart illustrating a method of predicting an auxiliary power unit fault according to an embodiment of the invention.

In accordance with an embodiment of the invention, FIG. 3 illustrates a method 100, which may be used for predicting an APU fault, which can include a failure. The method 100 begins at 102 by receiving a sensor signal from at least one of the multiple sensors 38 to define a sensor output. The sensor signal may include information from pre-flight and/or post-flight of the aircraft 50, which is when the APU 10 is typically used. Pre-flight and post-flight are typically when the aircraft is on the ground. Pre-flight and post-flight for purposes of the method 100 may also include when the APU 10 is rotating above a certain speed, such as the RPM being above five percent, so that sensor signals may be received when the aircraft is taking off and the APU is still being used to power the air conditioning. This may include receiving data from one or more of the multiple sensors 38. It is contemplated that the sensor output may be raw aircraft data from which a variety of other information may be derived or otherwise extracted. For example, the raw data that may be received may consist of temperatures, pressures, valve and actuator positions, etc.

The sensor signal may be windowed into the two regimes of pre-flight and post-flight and then statistical features may be taken thereof. For example, the received sensor output may be aggregated over time to define aggregated sensor data. This may also include aggregating the received sensor output over multiple flights. Statistical features may be taken of the aggregated data. For example, a median value, a running median value, a historical median value, a minimum value, a maximum value, or a range may be determined. It is also contemplated that other features may be derived using the sensor signals, such as the time taken for the APU 10 to start up and the rate at which the APU 10 was rotating when the APU 10 ignited. It will be understood that regardless of whether the data is received directly or derived from sensor output, the data may be considered to be sensor output.

At 104, the sensor output may be compared to reference values for the sensor output. In the instance where the sensor output includes aggregated sensor data this may include comparing the aggregated sensor data to the reference value. The reference values may include any number of reference values related to the APU 10, components thereof, and systems related thereto. For example, the reference values may include a value or suitable range related to temperatures, pressures, valve position, actuator positions, etc. The reference values may also include historically defined values or suitable ranges related to the APU 10 of the aircraft 50 or historical data for multiple other aircraft. In this manner, the reference value may be calculated from historical sensor output. Thus, the sensor output may be compared to results obtained from previous flights for the same aircraft and against the whole fleet of aircraft. Furthermore, the reference value may include a value that has been determined during flight such as by receiving an output of one of the multiple sensors 38. In this manner, it will be understood that the reference value may be defined during operation. Alternatively, the reference value may be stored in one of the database(s) as described above.

At 106, a fault in the APU 10 may be predicted based on the comparison at 104. For example, a fault in the APU 10 may be predicted when the comparison indicates the sensor output satisfies a predetermined threshold. In this manner, the controller 64 and/or the computer 80 may determine if the results of the comparison are acceptable. The term "satisfies" the threshold is used herein to mean that the variation comparison satisfies the predetermined threshold, such as being equal to, less than, or greater than the threshold value. It will be understood that such a determination may easily be altered to be satisfied by a positive/negative comparison or a true/false comparison. For example, a less than threshold value can easily be satisfied by applying a greater than test when the data is numerically inverted.

By way of non-limiting example, a time taken for the APU 10 to start may be determined from the sensor output; the determined time may then be compared to the reference value. If the determined time is larger than the reference value, then a fault may be predicted with the APU 10. For example, a fault may be predicted when the comparison indicates the time taken for the APU 10 to start up was greater than 50 seconds. As an additional example, a fault in the APU 10 may be predicted when the comparison indicates that a median inlet temperature in the pre-flight was greater than a reference temperature, such as 45 degrees Celsius. More specifically, when all other sensor readings look normal such a determination may predict an inlet temperature sensor fault. As yet another example, a fault in the APU 10 may be predicted when the comparison indicates a surge control valve position is less than or greater than a predetermined position. For example, a fault may be predicted when the surge control valve position, in the post-flight, is trending away from its long term median position by less than −0.5 degrees or greater than 0.5 degrees and may be used to predict a valve fault. Further still, a fault with the APU 10 may be predicted when the comparison indicates that the auxiliary power unit exhaust gas temperature, during the post-flight, is greater than a predetermined temperature. For example, the fault may be predicted when the sensor output indicates that the exhaust gas temperature is greater than 600 degrees Celsius. Such a determination may be used to predict a variety of faults including a load compressor fault. Any number of faults in the APU 10 may be predicted including an inlet temperature fault, a starter motor fault, a generator fault, a bleed valve fault, etc.

In implementation, the reference values and comparisons may be converted to an algorithm to predict faults in the APU 10. Such an algorithm may be converted to a computer program comprising a set of executable instructions, which may be executed by the controller 64 and/or the computer 80. Additional inputs to the computer program may include inputs from the multiple sensors 38, inputs from additional aircraft systems 62, inputs from additional sensors 70, etc.

At 108, the controller 64 and/or the computer 80 may provide an indication of the fault in the APU 10, as predicted at 106. The indication may be provided in any suitable manner at any suitable location including in the cockpit 56, such as on a primary flight display (PFD) therein, and at the ground system 82. For example, if the controller 64 ran the program, then the suitable indication may be provided on the aircraft 50 and/or may be uploaded to the ground system 82. Alternatively, if the computer 80 ran the program, then the indication may be uploaded or otherwise relayed to the aircraft 50. Alternatively, the indication may be relayed such that it may be provided at another location such as such as an airline control or flight operations department.

It will be understood that the method of predicting an APU fault is flexible and the method illustrated is merely for illustrative purposes. For example, the sequence of steps depicted is for illustrative purposes only, and is not meant to limit the method 100 in any way as it is understood that the steps may proceed in a different logical order or additional or intervening steps may be included without detracting from embodiments of the invention. By way of non-limiting example, the method 100 may also include determining when the APU 10 is in use or determining when the aircraft 50 is in pre-flight and/or post-flight. For example, it is contemplated that additional data such as altitude and air/ground speed as well as other general performance parameters output by the engines 52 may be received and it may be determined therefrom when the aircraft 50 is in pre-flight and/or post-flight. Furthermore, the method may include receiving data during a number of flights. It is contemplated that different faults may be detected using the results of the comparison over a number of flights. It will be understood that the number of flights used and the various thresholds set are all configurable. For example, it is contemplated that the sensor output may be smoothed to reduce the oscillations/noise in the data. This may include taking an average of the sensor output over any number of flights. Trends in the sensor output may also be calculated by comparing current flight values to those at a steady state in the past, such as an average value over 10 flights 50 flights ago. Further still, the method may include predicting the fault based on multiple comparisons.

Technical effects of the above described embodiments include that data gathered by the aircraft during pre-flight and post-flight may be utilized to predict an APU fault. This allows such predicted faults to be corrected before they occur. Currently the recording of fault occurrences is discretionary and requires the fault to be entered manually into a database this is costly and may not obtain all the relevant information. Further, there is currently no manner to predict the fault of an APU. The above described embodiments allows for automatic predicting, recording, diagnosing and alerting to users of faults. The above embodiments allow accurate predictions to be made regarding the APU faults. By predicting such problems sufficient time may be allowed to make repairs before such faults occur. This allows for cost savings by reducing maintenance cost, rescheduling cost, and minimizing operational impacts including minimizing the time aircraft are grounded. Further, by automating the recording of such faults, human error is reduced and a given aircraft's history will be more accurate, which may be helpful in future maintenance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of predicting an auxiliary power unit fault in an aircraft having an auxiliary power unit and multiple sensors related to the auxiliary power unit, components thereof, and systems related thereto, the method comprising:
   receiving, during at least one of pre-flight or post-flight, a sensor signal from at least one of the multiple sensors to define a sensor output;
   comparing, by a controller, the sensor output to a reference value for the sensor output;
   predicting, by a controller, a fault associated with the auxiliary power unit based on the comparison and prior to an occurrence of the predicted fault; and
   providing, by a controller, an indication of the predicted fault.

2. The method of claim 1, further comprising:
   receiving at least one of an altitude signal, a speed signal, or performances parameters outputted by an engine.

3. The method of claim 1, further comprising:
   determining when the aircraft is in pre-flight or post-flight.

4. The method of claim 1, further comprising:
   receiving information identifying an exhaust gas temperature during the post-flight,
   wherein the predicting the fault includes predicting the fault based at least in part on the comparing indicating that the exhaust gas temperature is greater than a predetermined temperature.

5. The method of claim 1, wherein
   aggregating the sensor output over time to define aggregated sensor data, and
   the comparing includes comparing the aggregated sensor data to the reference value.

6. The method of claim 5, wherein the aggregating the sensor output over time comprises aggregating the sensor output over multiple flights.

7. The method of claim 5, wherein the aggregated sensor data comprises at least one of a median value, a running median value, or a historical median value.

8. The method of claim 1, further comprising:
   receiving information identifying a median inlet temperature during the pre-flight,
   wherein the predicting the fault includes predicting the fault based at least in part on the comparing indicating that the median inlet temperature was greater than 45 degrees Celsius.

9. The method of claim 1, wherein the reference value is calculated from historical sensor output.

10. The method of claim 1, further comprising:
    receiving information identifying a surge control valve position during the post-flight,
    wherein the predicting the fault includes predicting the fault based at least in part on the comparing indicating the surge control valve position was less than −0.5 degrees or greater than 0.5 degrees.

11. The method of claim 1, further comprising:
    determining, from the sensor output, a time taken for the auxiliary power unit to start, and
    comparing the determined time to the reference value.

12. The method of claim 11, wherein the predicting the fault includes predicting the fault based on the comparing indicating the time taken for the auxiliary power unit to start was greater than 50 seconds.

13. The method of claim 1, wherein providing the indication comprises providing the indication on a primary flight display (PFD) in a cockpit of the aircraft.

14. The method of claim 1, wherein the predicting the fault comprises predicting the fault based on multiple comparisons.

15. A system comprising:
    one or more devices configured to:
       receive, during at least one of pre-flight or post-flight, a sensor signal from at least one of a set of sensors, associated with an auxiliary power unit of an aircraft, to define a sensor output;
       compare the sensor output to a reference value for the sensor output;
       predict a fault associated with the auxiliary power unit based on the comparison and prior to an occurrence of the predicted fault; and
       provide an indication of the predicted fault.

16. The system of claim 15, wherein
    the one or more devices are further configured to:
       aggregate the sensor output over time to define aggregated sensor data, and
    the one or more devices, when comparing the sensor output to the reference value, are configured to:
       compare the aggregated sensor data to the reference value.

17. The system of claim 16, wherein the one or more devices, when aggregating the sensor output over time, are configured to:
    aggregate the sensor output over multiple flights.

18. A non-transitory computer-readable medium storing instructions, the instructions comprising:
    one or more which, when executed by a processor of a device, cause the processor to:
       receive, during at least one of pre-flight or post-flight, a sensor signal from at least one of multiple sensors, associated with an auxiliary power unit of an aircraft, to define a sensor output;
       compare the sensor output to a reference value for the sensor output;
       predict a fault associated with the auxiliary power unit based on the comparison and prior to an occurrence of the predicted fault; and
       provide an indication of the predicted fault.

19. The non-transitory computer-readable medium of claim 18, wherein the instructions further include:

one or more instructions to aggregate the sensor output over time to define aggregated sensor data, and the one or more instructions to compare the sensor output to the reference value include:

one or more instructions to compare the aggregated sensor data to the reference value.

20. The non-transitory computer-readable medium of claim 19, wherein the one or more instructions to aggregate the sensor output over time include:

one or more instructions to aggregate the sensor output over multiple flights.

* * * * *